(12) United States Patent
Kasztenny et al.

(10) Patent No.: US 7,552,367 B2
(45) Date of Patent: Jun. 23, 2009

(54) FAULT RECORDING AND SEQUENCE OF EVENTS RECORDING DEVICE CAPABLE OF RECORDING COMMUNICATION-BASED SIGNALS RELATED TO ELECTRICAL POWER SYSTEMS

(75) Inventors: Bogdan Kasztenny, Markham (CA); Jeffrey Mazereeuw, Newmarket (CA)

(73) Assignee: General Electric Company, Schenectady, NY (US)

(*) Notice: Subject to any disclaimer, the term of this patent is extended or adjusted under 35 U.S.C. 154(b) by 1065 days.

(21) Appl. No.: 10/710,793

(22) Filed: Aug. 3, 2004

(65) Prior Publication Data

US 2006/0029105 A1    Feb. 9, 2006

(51) Int. Cl.
  *G06F 11/00* (2006.01)
  *G01R 15/00* (2006.01)
  *G01R 31/00* (2006.01)
  *G01M 19/00* (2006.01)
  *G08B 21/00* (2006.01)

(52) U.S. Cl. .................. 714/703; 361/62; 361/86; 361/87; 361/88; 702/57; 702/120; 702/122; 340/635

(58) Field of Classification Search ............... 714/703; 361/62, 86–88; 702/57, 120, 122; 340/635
  See application file for complete search history.

(56) References Cited

U.S. PATENT DOCUMENTS 5,535,193 A * 7/1996 Zhang et al. ............... 370/253
5,808,587 A * 9/1998 Shima ....................... 343/895
6,385,022 B1   5/2002 Kulidjian et al. ............. 361/62
6,469,629 B1  10/2002 Campbell et al. ........... 340/635
6,795,789 B2 * 9/2004 Vandiver .................... 702/122
2002/0103772 A1* 8/2002 Chattopadhyay ............ 705/412

FOREIGN PATENT DOCUMENTS

EP        1 385 013 A1    1/2002

* cited by examiner

*Primary Examiner*—Cynthia Britt
*Assistant Examiner*—John J Tabone, Jr.
(74) *Attorney, Agent, or Firm*—GE Global Patent Operation (57) ABSTRACT

A method for recording analog signals and digitally encoded information associated with primary and secondary devices of an electric power system includes: receiving a plurality of analog output signals and a plurality of ON/OFF status signals from the electric power system; receiving a time-synchronization analog signal and/or a time-synchronization data packet from a time synchronization source; maintaining an internal clock synchronized with the synchronization source; sampling and digitizing the plurality of analog output signals; monitoring a status and/or a change of status of the plurality of ON/OFF status signals; receiving digitally encoded information signals as incoming data packets; decoding and analyzing the incoming data packets; analyzing the plurality of analog output signals and digitally encoded information signals using a triggering algorithm; and storing digitized analog output signals and digitally encoded information signals together with corresponding timing information in a record as fault and sequence of events records.

43 Claims, 3 Drawing Sheets

FAULT RECORDING AND SEQUENCE OF EVENTS RECORDING DEVICE CAPABLE OF RECORDING COMMUNICATION-BASED SIGNALS RELATED TO ELECTRICAL POWER SYSTEMS

BACKGROUND OF THE INVENTION

The present invention generally relates to a method and apparatus for recording signals such as currents and voltages, positions of circuit breakers or other switching mechanisms, and output signals of protective relays and other protection and control devices for archiving and analysis purposes in electrical power systems. More particularly, the present invention allows recording both physical signals and other signals represented in digital data packets and shared between a number of devices that either send or receive such information over a digital communication means.

Electrical power distribution systems are monitored by protective and control devices. Protective relays are well-known for monitoring and providing protective control of electrical power distribution systems. As used herein, the term "electrical power distribution system" or "electrical power system" includes systems, and components of systems, for the generation, transmission, and/or distribution of electrical power to customers. Protective and control device primarily maintain operability of the electrical power system and ensure reliable delivery of electrical power to the customers. When the protective and control devices are required to operate, they must respond automatically within short periods of time.

Protective relays, for example, are installed to isolate a faulty component of the electrical power system in the event of equipment failure to maintain the remaining system in tact and to prevent the damage from spreading any further. Such relays are typically connected at a point on the electrical distribution system, to monitor current, voltage, or other parameters, and to provide protective control (e.g., by providing a control signal to cause power to be removed from the portion of the system with which the relay is associated) in the event that certain specified conditions occur. The protective relay isolates the faulty component by opening at least one associated circuit breaker. Thus, protective relays are in operable communication with power system currents and voltages, as well as certain auxiliary signals via instrument transformers and other sensors to detect such faulty components.

Equipment in an electrical power system can occasionally fail, as discussed above. Furthermore, the protective and control devices and instrument transformers installed to detect such failures may fail themselves, which may result in an unnecessary operation of the protection and control devices or a failure of the protective and control devices to operate when their operation is required. In such a complex environment, it is necessary to monitor both the primary power system equipment and associated secondary protection and control devices using independent recording devices (see FIG. 1). These include fault recorders, which primarily include digital fault recorders (DFRs) and sequence of events (SOE or SER) recorders. The DFRs record analog signals including currents and voltages predominantly, but may include other electrical or electrically represented quantities as well. The SOE recorders record changes in status of on/off signals including breaker position, operation of protective relays, trip signals for circuit breakers, but not limited thereto.

The operation of recording is accomplished by storing the relevant information on a permanent storage medium, such as a non-volatile memory in the case of digital devices, accompanied with storing reasonably accurate timing information. The timing and synchronization aspects are important as they allow analysis of the records produced at different sites in the electrical power systems.

In the past few years digital protection and control devices, or even instrument transformers, have emerged to work with power system signals that are not in the form of physical or analog quantities, but in the form of digital data packets exchanged over appropriate communication channels. Such communication channels include, but are not limited to, direct fiber optic connections, Ethernet, and serial ports, for example. Not only is the new form of representation different in nature (e.g., digital versus analog), the communicating protection and control devices use the digitally exchanged signals differently. For example, it is quite common to re-send the same information several times in order to make sure the information arrives at the intended destination; channel integrity messages may be exchanged to monitor the communication means; and check-sums or other security means may be attached to the body of the message to ensure integrity of the data. All of this creates new challenges for the task of fault recording and sequence of event recording.

As a rule, protection and control devices are capable of some level of recording digitally exchanged signals. However, the primary function of the protection and control devices is to, first, provide protection and/or control. As such, the protection and control devices themselves are subject to monitoring and their own records should not be fully trusted. Second, the protection and control devices support only those types of physical connections and communication connections that are required to perform their primary functions, not generic recording functions. Third, the data storage capabilities of the protection and control devices are typically limited allowing short-term recording only.

Accordingly, there is a need for a recording device and method that supports a variety of digital communication means and primarily functions to record faults and sequence of events in an electrical power system.

BRIEF DESCRIPTION OF THE INVENTION

The above discussed and other drawbacks and deficiencies are overcome or alleviated by a method for recording analog signals and digitally encoded information associated with primary devices of an electric power system and secondary devices associated with the electric power system. The method includes receiving a plurality of analog output signals from corresponding transducers of the electric power system; receiving a plurality of ON/OFF status signals from the primary and secondary devices of the electric power system; receiving at least one of a time-synchronization analog signal from a time synchronization source and a time-synchronization data packet from the time synchronization source over a communication medium; maintaining an internal clock synchronized with the synchronization source for time synchronization; sampling and digitizing the analog output signals; monitoring at least one of a status and a change of status of the ON/OFF status signals; receiving digitally encoded information signals as data packets via a communication port; decoding and analyzing the content of the incoming data packets; analyzing both the analog output signals and digitally encoded information signals using a user-programmable triggering mechanism; and storing the incoming analog output and digitally encoded information signals together with corresponding timing information in a record as fault and sequence of events records in a non-volatile memory storage medium of a hosting device.

In another embodiment an apparatus for recording analog signals and digitally encoded information associated with primary devices of an electric power system and secondary devices associated with the electric power system is disclosed. The apparatus includes a hosting device configured for: receiving a plurality of analog output signals from corresponding transducers of the electric power system; receiving a plurality of ON/OFF status signals from the primary and secondary devices of the electric power system; receiving at least one of a time-synchronization analog signal from a time synchronization source and a time-synchronization data packet from the time synchronization source over a communication medium; maintaining an internal clock synchronized with the synchronization source for time synchronization; sampling and digitizing the analog output signals; monitoring at least one of a status and a change of status of the ON/OFF status signals; receiving digitally encoded information signals as data packets via a communication port; decoding and analyzing the content of the incoming data packets; analyzing both the analog output signals and digitally encoded information signals using a user-programmable triggering mechanism; and a non-volatile memory storage medium in operable communication with the hosting device, the non-volatile memory storage medium storing the incoming analog output and digitally encoded information signals together with corresponding timing information in a record as fault and sequence of events records.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
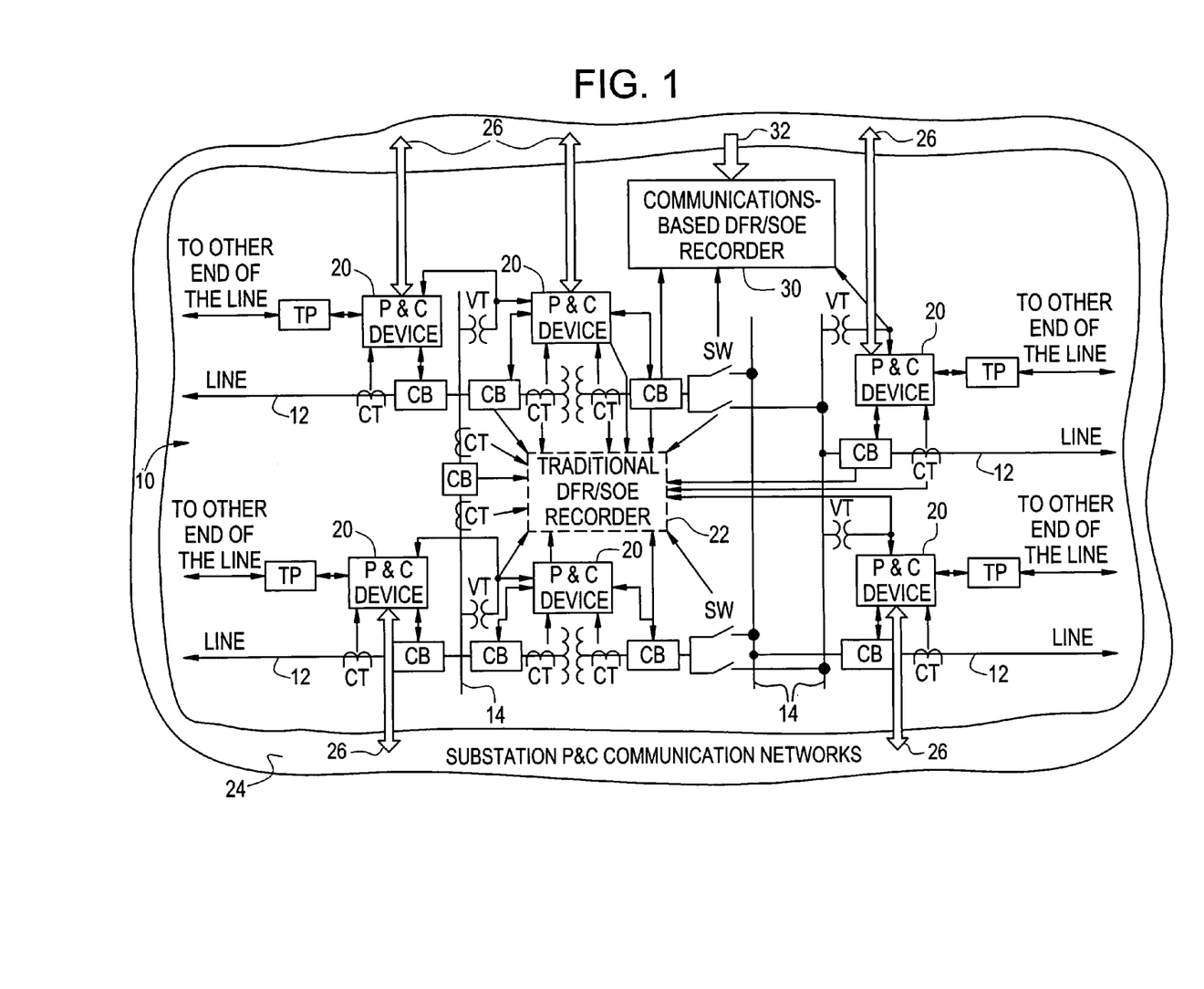
FIG. 1 depicts an application of a digital fault recorder (DFR) and a sequence of events (SOE) recorder according to an embodiment of the present invention.

Referring to FIG. 1, an electrical power distribution system 10 is depicted with a plurality of transmission lines 12 extending from one of three bus lines 14. Each transmission line includes one or more of a current transformer (CT), a voltage transformer (VT), a circuit breaker (CB), and may include a TeleProtection (TP) device that links some of all of the terminals of the line, in communication with a protection and control (P&C) device 20. The prior art discussed above includes a traditional digital fault recorder (DFR) and sequence of events (SOE) recorder 22 (shown with phantom lines) in communication with a plurality of CTs, VTs, CBs, TPs, and P&Cs 20 to record corresponding information therefrom.

In an exemplary embodiment still referring to FIG. 1, each P&C device 20 is in communication with a substation protection and control (P&C) communication network 24 shown generally with double-ended arrows 26. A communications based DFR/SOE recording device 30 replaces the traditional digital fault recorder (DFR) and sequence of events (SOE) recorder 22 and is communication with network 24 to retrieve information therefrom shown generally with a single direction arrow 32.

Figure 2:
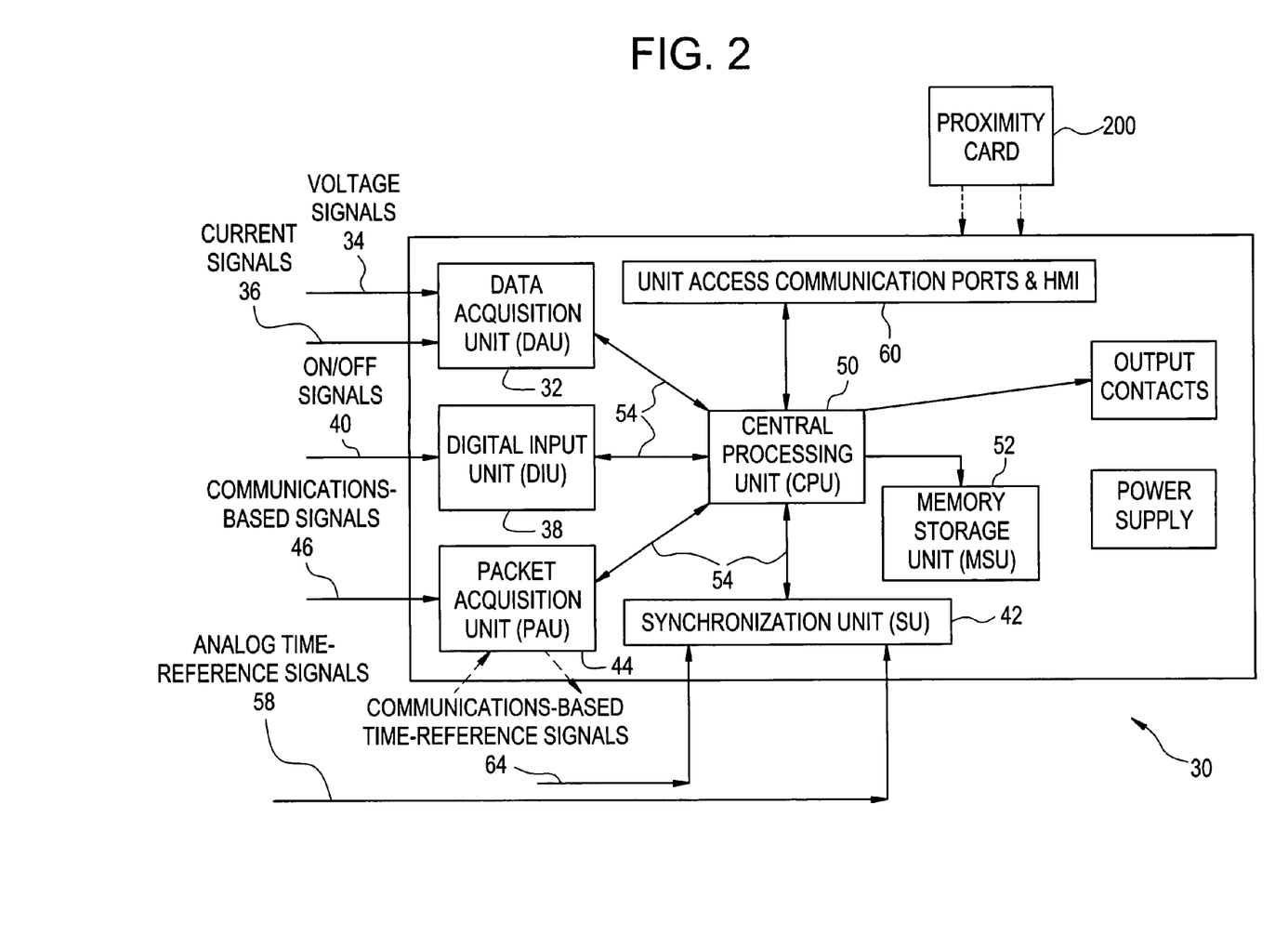
FIG. 2 depicts an overall block diagram of a fault and sequence of events recording device in accordance with an exemplary embodiment.

With reference to FIG. 2, recording device 30 includes the following logical entities: a data acquisition unit (DAU) 32 capable of interfacing with physical signals including voltage signals 34 from the VTs and current signals 36 from the CTs, a digital input unit (DIU) 38 capable of interfacing with the ON/OFF signals 40, a synchronization unit (SU) 42 capable of synchronizing the device 30 to an externally provided reference clock, a packet acquisition unit (PAU) 44 capable of interfacing with digitally-encoded signals 46, a central processing unit (CPU) 50, and a memory storage unit (MSU) 52. These entities may be implemented as separate sub-systems of the device 30 or two or more can be integrated together. In any case, the above enumerated sub-systems are in communication with the CPU 50 shown generally with arrows 54.

The DAU 32 includes isolating transducers such as input transformers or optical transducers, anti-aliasing analog filters (AAF), an analog-to-digital (A/D) converter and associated electronic circuitry that controls the process of sampling, converting an analog signal to a digital form, time stamping and synchronizing, and temporarily storing the acquired information before final placement in the MSU 52 of device 30.

The DIU 38 includes isolating transducers and associated electronic circuitry that controls the process of detecting position (ON/OFF) and change in the position of the digital inputs, recording state and/or change of state, time stamping and synchronizing, and temporarily storing the acquired information before final placement in the MSU 52 of device 30.

The SU 42 is responsible for synchronizing the internal clock of the recording device 30 to a reference time. The reference time is may be provided as an analog signal depicted generally at 58 as in the IRIG-B format and may be driven from an accurate common time clock, such as, but not limited to, a Global Positioning System (GPS) receiver. Alternatively, time synchronization can be achieved via digital communication over one of the communication ports 60.

The DAU 34, DIU 38, and SU 42 are presently known as parts of existing DFR and SER devices 22, however the present disclosure relates to data packet acquisition, memory storage, enhanced security, wireless access and combinations of the above.

The PAU 44 includes communication port 60 and associated hardware and software capable of decoding incoming information packets associated with communications based signals 46, converting the data packets into a form compatible with other physical channels supported by the DAU 32 and DIU 38 interfaces, and records the digitally-delivered signals in a common format in MSU 52 for all of the signals 34, 36, 40, and 46 in a time-aligned fashion. In addition, the PAU 44 decodes, analyzes, and records auxiliary information in signals 34, 36, 40, and 46 that is added to the main data stored in MSU 52. This recorded auxiliary information includes, but is not limited to: all of the reattempts of a same original message, timing of the packet arrival in addition to the timing of the original content if included in the message, information related to corrupted bits and content-recovery operations such as the Cyclic Redundancy Check (CRC), for example. Unlike the traditional DFR/SOE recorders 22 that receive digitally-encoded signals from P&C device 20, device 30 records packets even if the packets do not pass the message integrity check (CRC). In this manner, a record of activity is created for further analysis as per the primary function of recording the pre-selected activities of interest, even if the content of the packet is corrupted and useless from the point of view of direct utilization.

It will be noted that PAU 44 supports common communication ports and media such as fiber, Ethernet, serial, infrared and wireless connections. PAU 44 supports a variety of communication protocols and data-encoding conventions such as, for example, utility communications architecture (UCA) including UCA generic object oriented substation event (GOOSE) messaging, common system control and data acquisition (SCADA), and substation integration protocols (e.g., Ethernet Global Data (EGD), and other public or proprietary protocols, as long as the transmitted information is related to the state of the electric power system 10 (e.g., volts, amperes, watts, VArs, power factor, harmonic content, and ON/OFF status signals, for example).

In an exemplary embodiment, recording device 30 is capable of real-time decryption of encrypted information being monitored if provided with the security access. Alternatively, device 30 may record the encrypted information for possible decryption in an off-line (post-mortem) mode.

Digital protection and control devices 20 may use network-based synchronization mechanisms. Simple Network Transport Protocol (SNTP) based on the Ethernet is a good example, but more advanced and accurate public or proprietary algorithms are available as well. The network-based synchronization relies on sending and receiving data packets over a digital communications medium. These data packets shall be monitored as the protection and control devices 20 may respond incorrectly should such packets be corrupted. Recording signals meant for time synchronization is within the scope of this disclosure as long as the data packets are meant to facilitate time synchronization between separate protection and control devices 20 in electric power system 10.

Modern protection and control devices 20 of electric power systems 10 may exchange data structures that are more complex than just a value of voltage and current from a given point in the primary equipment. Devices 20 may exchange important configuration data, or files. Recording of this kind of information is within the scope of this disclosure as long as the recorded data structures are related to primary or secondary equipment of the electric power system.

The CPU 50 controls various subsystems of device 30 and provides an interface 64 at communication port 60 with the user. The interface may include configuration of the device and retrieval or manipulations of the stored records in MSU 52. The CPU 50 is equipped with its own communication port of communication port 60 in order to support communication with a set-up program and automated retrieval and management of stored records. The CPU 50 and PAU 44 work with independent ports in device 30. It is possible to combine the ports of the CPU 50 and PAU 44, as such a combination is contemplated in the disclosure. The CPU 50 and/or DAU 32 and DIU 38 incorporate triggering algorithms that allow device 30 to start and stop recording based on pre-programmed conditions.

The MSU 52 provides permanent storage for the recorded signals. In order to meet common requirements, any DFR or SER uses non-volatile memory storage and device 30 incorporates non-volatile removable memory storage. This means that the MSU 52 may be removed from device 30 either when device 30 is powered ON or OFF and carried to an independent reader in order to retrieve the content without danger of loosing the data. MSU 52 supports removable memory storage as long as the stored data on MSU 52 includes recordings of signals of electric power system 10 and configuration data of protection and control devices 20.

Types of Recorded Signals

The recording device or hosting device 30 described above is capable of recording several types of signals associated with electric power systems 10 and protection and control devices associated therewith. In an exemplary embodiment, these signals are classified as follows:

Type-A signals are analog electrical signals directly connected to the input terminals of device 30. Currents and voltage signals 34 and 36, respectively, are of primary interest but other signals such as power, temperature, harmonic content, and phase angle, for example, generated by various transducers or converters are measured as well. These signals are handled by the DAU 34 of device 30, and are recorded as streams of digitized samples representing magnitude of a given signal at a given time. The samples are taken at the rate that ensures adequate analysis of the signal at regular or varying time intervals. The sampling times are recorded with accuracy ensuring intended analysis in particular when comparing the record with records of other recorders 30 installed at various locations in the electric power system 10.

Type-B signals are positions (ON/OFF) of various auxiliary electric system devices or associated protection and control equipment 20 in the form of voltage or resistance (low voltage=off, high voltage=on, or vice versa; low resistance=on, high resistance=off, or vice versa). Position of a circuit breaker (CB) (e.g., closed or open) and position of any contact of any associated protection or control devices 20 are good examples. These signals correspond with On/OFF signals 40 handled by the DIU 38 and recorded as transitions from on to off or vice versa. Accurate time stamping of the transition is incorporated to facilitate analysis of the records.

Type-C signals are continuous signals associated with the electric power system 10 and its auxiliary equipment such as voltages, currents, power, temperature, and symmetrical components, for example, but in a form of digital data packets corresponding to communications based signals 46. Signals 46 are sent by other devices associated with the original physical signals. Such devices include non-conventional current transformers (CT) and voltage transformers (VT) with digital output, protective relays, meters, and various controllers. These devices measure physical signals, encode them in a digital form, and make them available to other devices via a digital communication medium. The PAU 44 of the hosting device 30 receives and handles these type of signals 46. A number of recording options are available for this class of signals as described hereinafter.

Type-D signals are status (ON/OFF) signals associated with the primary electric power system 10 or its auxiliary devices, but in a form of digital data packets. The PAU 44 of the hosting device handles this type of signal corresponding to signals 46, as well. A number of recording options is also available for this class of signals as described hereinafter.

Type-E signals are signals ensuring time synchronization between protective relays, control, metering and recording devices in electric power systems 10. The recording device 30 is capable of recording such signals—either analog or in a form of digital data packets. Dedicated circuitry of the SU 42 handles the analog synchronizing signals 58, and the PAU 46 handles the packet-based time synchronization signals indicated generally at 64. Phantom lines shown generally at 66 indicate packet-based time synchronization signals 64 received by PAU 44 and then directed to SU 42.

Type-F signals are events derived by the reorder itself and related to the communication medium used to transport signals of Type-C, Type-D and Type-E. Examples include, but are not limited to, percentage usage of bandwidth, loss of channel, and failed CRC count, for example.

Type-G signals are audio and video signals in the form of digital packages. The video information may include video from both still and motion digital cameras, typically from a substation plant surveillance system (not shown). More and more often these signals are transported digitally over a utilities or plant communication networks using common-purpose media such as the Ethernet and known compression algorithms such as MPEG. Overlaying such video and audio channels on power system signals enhances both archiving and prospective analysis of the records.

Existing DFR and SER recorders 22 support Type A and Type B signals. In accordance with an exemplary embodiment, recording device 30 records at least one Type-A or Type-B signal simultaneously with at least one signal of Type-C, Type-D, Type-E, Type-F or Type-G.

Figure 3:
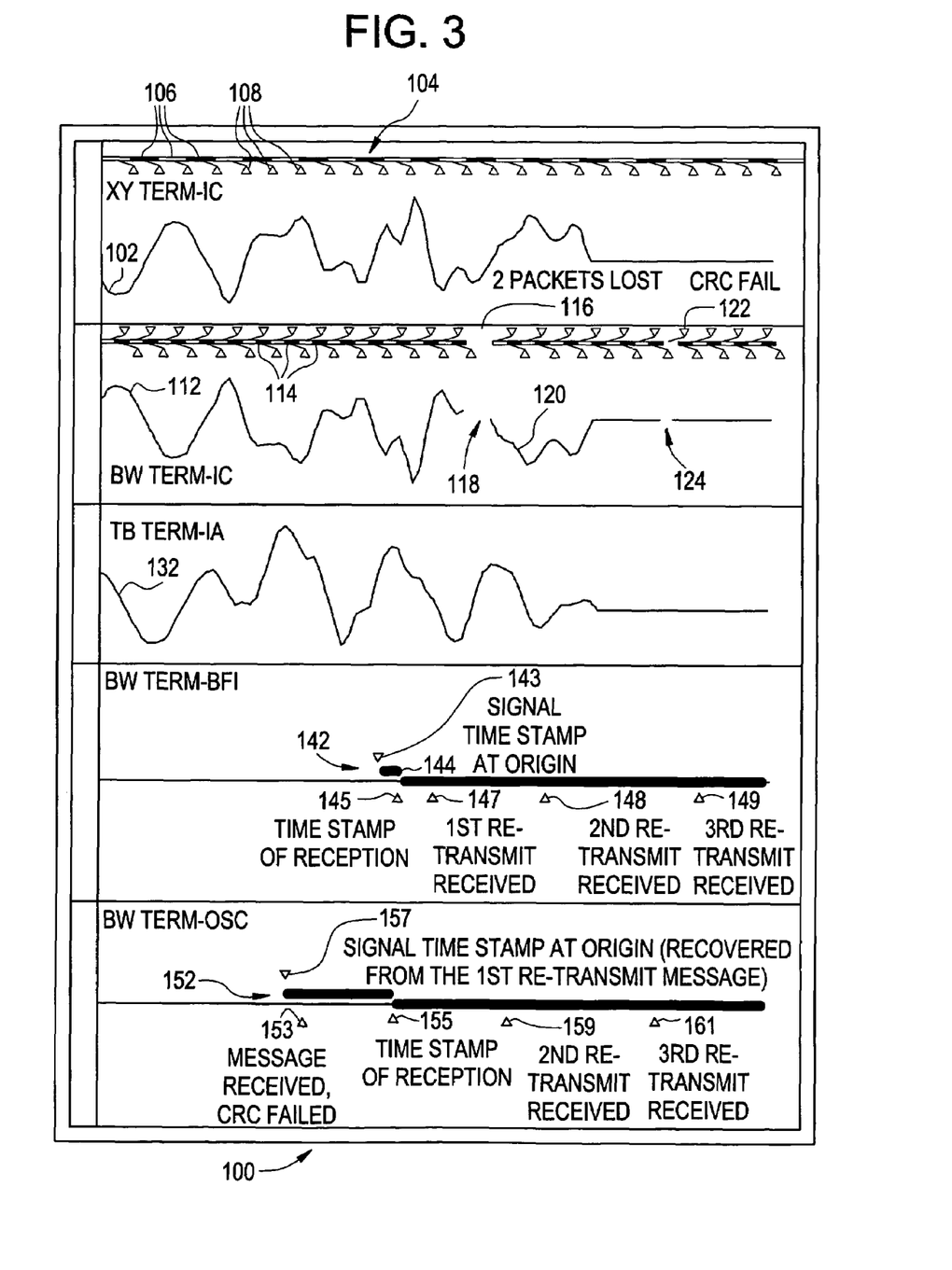
FIG. 3 depicts a sample record produced by the device of FIG. 2 in accordance with an exemplary embodiment.

FIG. 3 presents a sample record 100 produced by the recording device 30 of FIG. 2. FIG. 3 illustrates an "XY TERM-IC" signal 102 which is a communication-based current signal of communications-based signals 46 received by PAU 44 received in digital packets 104. The packets 104 content is marked by rectangles 106. The packet reception times are marked by triangles 108.

An "BW TERM-IC" signal 112 is also a communication-based current signal received via network. Signal 112 is received in packets 114 of varying size compared with the previous signal 102. In this example, two consecutive packets 114 were not received at 116 resulting in a gap 118 in a signal plot 120 thereof. Another packet 114 was received and time-stamped indicated at 122, but the content was corrupted (CRC fail) resulting in another gap 124 in the plotted waveform 120.

A "TB TERM-IA" signal 132 is a local signal measured directly by the recording device 30.

A "BW TERM-BFI" signal 142 is an ON/OFF signal 40 changing state from OFF to ON and received by DIU 38. The recording device 30 records a change of state at an origin 143 as included in the data packet 144; an original reception time 145 as well as reception times 147, 148, and 149, respectively, for all re-transmit messages received for this change of state.

A "BW TERM-OSC" signal 152 is an ON/OFF signal 40 changing state from OFF to ON. Signal 152 illustrates that the original message was received, but failed the CRC check as depicted in the record indicated at 153. The first re-transmit message arrived later and has been time stamped upon reception at 155. A time stamp at origin 157 has been included in the plot as well. Subsequent re-transmit messages have been time-stamped and marked as well, generally indicated at 159 and 161.

Signals Related to Electric Power Systems Shared as Digital Packets

Today's technology is moving into a direction of sharing electric power system related signals in real-time in the form of digital packets instead of physical analog signals wired to all of the devices that may require access. A number of practical solutions are available today, and more are being developed.

Basic aspects of digitally transmitted signals, and specifically electric power system signals include, but are not limited to:

1. Identification of the originating device, device scaling and calibration data, and electric system location where the signal is measured, digitized and shared.
2. Identification of destination device or devices.
3. Main data.
4. Timing information for the main data.
5. A data integrity check and an error correction portion of the packet.
6. A retransmit scheme forcing the same information to be repeated several times in order to increase dependability of connection.
7. Data validity flags encoding accuracy of the main data and/or health of the sending device.

The above described recording device 30 is capable of recording the above aspects of digital communication in addition to the main data. In particular, signals intended for selected destinations may be recorded while the rest of the traffic is ignored and identification of all of the destination devices can be recorded with the signal itself. Timing information at the origin and/or timing of packet reception may be recorded and corrupted packets may also be recorded providing an indication of communication activity even if the packet is not valid. Original and error-corrected packets may be recorded should an error occur while an error-correction mechanism recovers the original message. Retransmit events may be recorded together with the original message as per a user setting. Lastly, a health status of the originating devices may be recorded and monitored. With more than one data source for the same power system signal, the recording device is capable of substituting a signal with an equivalent signal from the other originating device should the original device fail. The above features are implemented in software, controlled by user settings, and may be provided in a number of combinations.

Recording Events and Parameters of the Communication Medium

Recording device 30 is further capable of recording events and parameters of the communication medium (e.g., channel) that is applied to transport the electric power system signals in digital packets. The health of the communication medium is critical for the performance of devices that are programmed to receive and react to the incoming signals, and therefore, should be monitored simultaneously with the power system signals. Recording device 30 is capable of recording the following events and parameters, of the communication network, but is not limited to: 1) count of failed CRCs for all or selected incoming packets (e.g., approximate measure of a Bit Error Rate of the channel); 2) percentage usage of channel bandwidth; 3) loss and recovery of the communication channel; 4) Bit Error Rate measured by sending and receiving pre-defined messages between any two units of the recording device; 5) Bit Error Rate measured by sending, echoing back, and receiving pre-defined messages between any two units of the recording device 30; 6) round trip delay between any two units of the recording device 30; 7) percentage of unreturned messages between any two units of the recording device 30 set up into the echo mode; and 8) loss of communication between any two units of the recording device 30.

Data Security and Cyber Attacks

Being a part of the critical infrastructure of electric power supply systems, devices that exchange critical information over a digital communications network are potentially exposed to data security issues. It is envisioned that future communications architectures will use data encryption techniques to insure integrity and confidentiality of the real-time protection and control of data. A number of algorithms are available for securing the data and it is contemplated that variants thereof will be optimized for real-time execution to be used in next generation digital protection and control devices for electric power systems. The above described recording device 30 recognizes this need and allows recordation of the encrypted information for post-mortem decryption and analysis, or alternatively, decrypts the data in real time before recording the raw data. Furthermore, the recording device 30 allows internal encryption of its own records so that they cannot be viewed or used by unauthorized parties. The above described data security features may provided by a set of software and hardware means known to those skilled in the pertinent art.

Wireless Ports

With improved security of wireless connections, some of the digital communication channels for electric power system devices will migrate toward wireless connections in which this trend has already been initiated. Thus, in an exemplary embodiment, recording device 30 supports wireless ports for the digitally encoded signals to be recorded as well as for its own configuration, access and record retrieval.

Memory Storage

Large capacity memory is required for a large scale DFR/SER. At the same time it is not preferable to use any rotating parts in a substation environment. Therefore a hard disk is not a preferred option for massive storage, although it is often used in the existing DFRs. However, with recent advances in static memory chips, large capacity memory is available with the option of removable plug-and-play applications. Accordingly, it is envisioned that recording device 30 may use a single or multiple removable memory media (memory "stick") as MSU 52. The MSU 52 may be removed when the recorder is powered up and operational, and can be read by an independent reader such as a PC computer connected via a Universal Serial Bus (USB) port or equivalent. Upon insertion, MSU 52 or the memory medium is fully tested by recording device 30 to check integrity of the removable memory before using it for data storage.

With multiple memory storage units 52, recording device 30 preserves recording capabilities when some of the memory units are inserted, tested or removed. It will be noted that in exemplary embodiments, the removable memory is absent any mechanical parts with respect to the DFR/SER devices. Furthermore, the type of connection is not relevant and is not limited to the currently broadly applied USB standard. As discussed above recording device 30 allows encoding of the content of the removable memory for data security reasons and this functionality may be achieved by both hardware and software means know in the art.

Time Synchronization

Recording device 30 may be synchronized to a common time base such as the universal global clock driven by a GPS or equivalent terrestrial/satellite system in one of two ways. One way includes an analog signal using an IRIG-B time synchronization standard as in signal 58 in FIG. 2. Another way includes a communication network with special data packets and help from algorithms that allow precise synchronization. For the latter method, a number of approaches can be implemented, and is not limited to any particular algorithm. In any selected algorithm, it should protect application of the data packets for time synchronization in the recording device 30 for electrical power system 10.

Secure Access and Commands

Recording device is also capable of receiving user and password access entries, as well as operational commands with the use of a proximity card 200 generally depicted in FIG. 2. The proximity card 200 may be used as both security access authentication and as a holder of pre-programmed commands (e.g., macros) that are accepted by the device 30 and executed immediately or according to a pre-programmed schedule. The "commands" include but are not limited to setting changes, clearing records, disabling certain functions, for example.

The proximity card 200 uses an electromagnetic signal generated by a "reader" (not shown) on the recording device to self-power, perform its functions, and communicate with the "reader" in a wireless fashion, in particular.

Triggering and Record Organization

The device 30 is capable of storing and organizing records per each individual port, as a part of Virtual Private Network (VPN) or an equivalent logical division mechanism of a common physical communication network. The device 30 is capable of automatically initiating communication with a higher-order system based upon pre-programmed conditions such as, but not limited to, high memory utilization, self-test error, and low quality of a monitored communication channel, for example.

The device 30 may be programmed to use different sampling/recording rates for physical and communication based signals 34, 36, 40, and 46. In particular, each channel—regardless of its nature—may use a different and dynamically changing sampling rate. The communication-based signals 46 are recorded using multiple communication protocols running simultaneously on a single or multiple communication ports 60 of device 30. This includes the concept of primary and secondary ports with a fast and automated switchover mechanism.

The present invention overcomes the problems noted above by presenting, in exemplary embodiments, a device that is capable of fault and sequence of events recording in the environment where some signals are represented by physical analog quantities, and others are represented by digital packages. Moreover, advanced recording features are provided for the signals that are carried digitally.

In particular, a recording or hosting device capable of recording both analog signals directly connected to its input terminals and digitally encoded signals arriving in data packets over a communication medium is disclosed herein. Both categories of signals are related to electric power systems and are recorded in a synchronized manner for further analysis of events as so called digital fault records and sequence of events records. A variety of new options are provided with respect to the digitally encoded signals that includes recording corrupted records in their original form, recording encoded information in the original form or decoding it on-line, time tagging of the incoming packets, supporting communication channel monitoring functions, and others. The device is using removable memory for the stored records with options to initiate recording with the storage medium removed, protect data from cyber attacks, and wireless access for authentication, device setup and record access purposes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for recording analog signals and digitally encoded information associated with primary devices of an electric power system and secondary devices associated with the electric power system, the method comprising:
   receiving a plurality of analog output signals from corresponding transducers of the electric power system;
   receiving a plurality of ON/OFF status signals from the primary and secondary devices of the electric power system;
   receiving at least one of a time-synchronization analog signal from a time synchronization source and a time-synchronization data packet from the time synchronization source over a communication medium;
   maintaining an internal clock synchronized with the synchronization source for time synchronization;
   sampling and digitizing the plurality of analog output signals to generate digitized analog output signals;
   monitoring at least one of a status and a change of status of the plurality of ON/OFF status signals;
   receiving digitally encoded information signals originating in the primary and secondary devices as incoming data packets from a substation protection and control communication network via a communication port;
   decoding and analyzing the incoming data packets;
   analyzing both the plurality of analog output signals and digitally encoded information signals using a triggering algorithm; and
   storing the digitized analog output signals and digitally encoded information signals together with corresponding timing information in a record as fault and sequence of events records in a non-volatile memory storage medium of a hosting device.

2. The method of claim 1, wherein at least one digitally encoded information signal related to at least one of the electric power system and the secondary devices is recorded.

3. The method of claim 1, wherein the receiving digitally encoded information signals includes independently time tagging each incoming data packet for the record.

4. The method of claim 1, wherein reception of the digitally encoded information signals is recorded even if the incoming data packet is corrupted.

5. The method of claim 1, wherein copies of a same incoming data packet are recorded if at least one of a re-transmit and an auto-repeat scheme is in place.

6. The method of claim 1, wherein the incoming data packets are encrypted packets recorded in their original encrypted form.

7. The method of claim 6, wherein the encrypted packets are deciphered from their original encrypted form in real-time and stored in a decrypted form.

8. The method of claim 1, wherein auxiliary information contained in the data packet includes at least one of a cyclic redundancy check and sequence numbers and is stored as a part of the record.

9. The method of claim 1, wherein time-synchronization data packets facilitating the time synchronization over the communication medium are time tagged and recorded.

10. The method of claim 1, wherein existence and configuration of devices producing the digitally encoded information signals to be recorded is recognized automatically based on an applied communication protocol.

11. The method of claim 1, wherein a health status of the communication medium used to transport a content of the digitally encoded information signals is monitored via at least one of a hardware and software means, and detected problems are time tagged and recorded as a part of the record.

12. The method of claim 1, wherein a percentage usage of the communication medium used to transport the digitally encoded information signals is monitored via at least one of hardware and software means, and recorded as a part of the record.

13. The method of claim 1, wherein the digitally encoded information signals are received via a wireless port.

14. The method of claim 13, wherein a health status of a wireless communication medium used to transport a content of the digitally encoded information signals is monitored via at least one of a hardware and software means, and detected problems are time tagged and recorded as a part of the record.

15. The method of claim 1, wherein a health status of the corresponding analog transducer is recorded with the analog output signal of the corresponding transducer.

16. The method of claim 1, wherein the time synchronization of the internal clock is achieved based on the incoming data packets instead of a dedicated time synchronization analog signal.

17. The method of claim 16, wherein the incoming packets used to synchronize the internal clock share a communication port with the incoming data packets.

18. The method of claim 1, wherein the memory storage medium is a removable memory storage medium which is removable without disassembling the hosting device in which it is employed.

19. The method of claim 18, wherein the record of the memory storage medium is preserved for access through a separate reading device.

20. The method of claim 18, in which the memory storage medium is removable and insertable with the hosting device being powered on.

21. The method of claim 18, wherein the removable memory storage medium comprises of two or more independent storage units.

22. The method of claim 18, wherein a recording function of the hosting device are retained during removal and insertion of the removable memory storage medium.

23. The method of claim 18, wherein the memory storage medium has no part thereof movable relative to any other part thereof.

24. The method of claim 18, wherein the removable memory storage medium is encrypted and readable only after providing appropriate security information.

25. The method of claim 18, wherein the removable memory storage medium is internally tested upon insertion and before use thereof.

26. The method of claim 1, wherein a configuration of the hosting device and stored records are protected from cyber attacks by authentication procedures that utilize wireless access.

27. The method of claim 26, wherein the authentication is performed with a proximity card, the proximity card absent electrical wires and an internal power source.

28. The method of claim 1, wherein a configuration of the hosting device is changed with a proximity card, the proximity card absent electrical wires and an internal power source.

29. The method of claim 1, wherein the hosting device is controlled wirelessly for at least one of configuration changes, record management, and other supported functions.

30. The method of claim 1, wherein a number of self-tests are performed continuously or periodically in order to monitor integrity of the hosting device.

31. The method of claim 30, wherein the hosting device is configured to report internal problems absent a power supply connected therewith.

32. The method of claim 1, wherein the hosting device is capable of initiating communication with one of a higher order system and a device based on pre-defined conditions, the pre-defined conditions include at least one of high memory utilization and self-test error.

33. The method of claim 1, wherein the hosting device is configured to retrieve the record and change a configuration of the hosting device via at least one of public, proprietary system control and data acquisition, and substation integration protocols.

34. The method of claim 1, wherein a storing rate for both the plurality of analog output signals and digitally encoded information signals is different for different channels corresponding to different physical inputs and different communication ports.

35. The method of claim 1, wherein a storing rate for both the plurality of analog output signals and digitally encoded signals is dynamic and controlled via user-definable conditions.

36. The method of claim 1, wherein the hosting device simultaneously supports a multitude of communication protocols for the digitally encoded information signals over a single or multiple communication ports.

37. The method of claim 1, wherein the hosting device supports primary and secondary communication ports.

38. The method of claim 37, further comprising recording the digitally encoded signals separately for the primary and secondary ports.

39. The method of claim 1, further comprising creating separate records for various groups of the digitally encoded signals based on a logical organization of the communication medium.

40. The method of claim 1, further comprising sending and receiving a test message intended to monitor at least one of integrity and quality of the communication medium.

41. The method of claim 40, wherein one of the primary and secondary devices sends and another echoes back the test message, wherein comparison of the sent and echoed messages allows monitoring parameters of the communication medium.

42. The method of claim 1, further comprising recording and overlaying with at least one of power system signals, selected video and audio signals available as digital packets, and signals related to monitoring electric power system.

43. An apparatus for recording analog signals and digitally encoded information associated with primary devices of an electric power system and secondary devices associated with the electric power system, the apparatus comprising:

a hosting device configured to perform the steps of:

receiving a plurality of analog output signals from corresponding transducers of the electric power system;

receiving a plurality of ON/OFF status signals from the primary and secondary devices of the electric power system;

receiving at least one of a time-synchronization analog signal from a time synchronization source and a time-synchronization data packet from the time synchronization source over a communication medium;

maintaining an internal clock synchronized with the synchronization source for time synchronization;

sampling and digitizing the plurality of analog output signals to generate digitized analog output signals;

monitoring at least one of a status and a change of status of the plurality of ON/OFF status signals;

receiving digitally encoded information signals originating from the primary and secondary devices as incoming data packets from a substation protection and control communication network via a communication port;

decoding and analyzing the incoming data packets;

analyzing both the digitized analog output signals and digitally encoded information signals using a triggering algorithm; and a non-volatile memory storage medium in operable communication with the hosting device, the non-volatile memory storage medium storing the digitized analog output signals and digitally encoded information signals together with corresponding timing information in a record as fault and sequence of events records.

* * * * *